(12) United States Patent
Karp et al.

(10) Patent No.: US 6,205,466 B1
(45) Date of Patent: Mar. 20, 2001

(54) INFRASTRUCTURE FOR AN OPEN DIGITAL SERVICES MARKETPLACE

(75) Inventors: Alan H. Karp, Palo Alto; Rajiv Gupta, Los Altos; Arindam Banerji, Sunnyvale; Ernest Mak, Fremont; Sandeep Kumar, San Jose; Guillermo Rozas, Mountain View; Chia-Chiang Chao, Saratoga; Venkatesh Krishnan, Sunnyvale; Alexandre Bronstein, Palo Alto, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/118,248

(22) Filed: Jul. 17, 1998

(51) Int. Cl.[7] ........................................... G06F 9/00
(52) U.S. Cl. ................... 709/104; 707/1; 707/2; 707/200; 709/216; 709/218; 709/223; 709/224; 709/226; 709/246
(58) Field of Search ....................... 709/101, 102, 709/103, 104, 216, 218, 223, 224, 226, 200; 707/1, 2, 200

(56) References Cited

U.S. PATENT DOCUMENTS

| | | | |
|---|---|---|---|
| 5,838,965 | * 11/1998 | Kavanagh et al. | 707/103 R |
| 6,044,367 | * 3/2000 | Wolff | 707/2 |
| 6,101,508 | * 8/2000 | Wolff | 707/1 |

* cited by examiner

Primary Examiner—Majid Banankhah

(57) ABSTRACT

A software infrastructure for providing an open digital services marketplace including a naming manager that enables a requesting task to refer to a desired resource using a name which is local to the requesting task and a router that forwards the request to an appropriate handler for the desired resource and that enables at least one additional task to be invoked in response to the request. The infrastructure includes a permission manager that compares a set of access rights of the requesting task to the desired resource to a set of permissions associated with the desired resource such that the access rights are kept separately from the reference to the desired resource. The desired resource, the requesting task, the additional task, and a set of additional components used to handle the request are each modeled as a resource defined by a corresponding set of meta-data which includes a set of attributes and a reference to a grammar for interpreting the attributes.

20 Claims, 8 Drawing Sheets

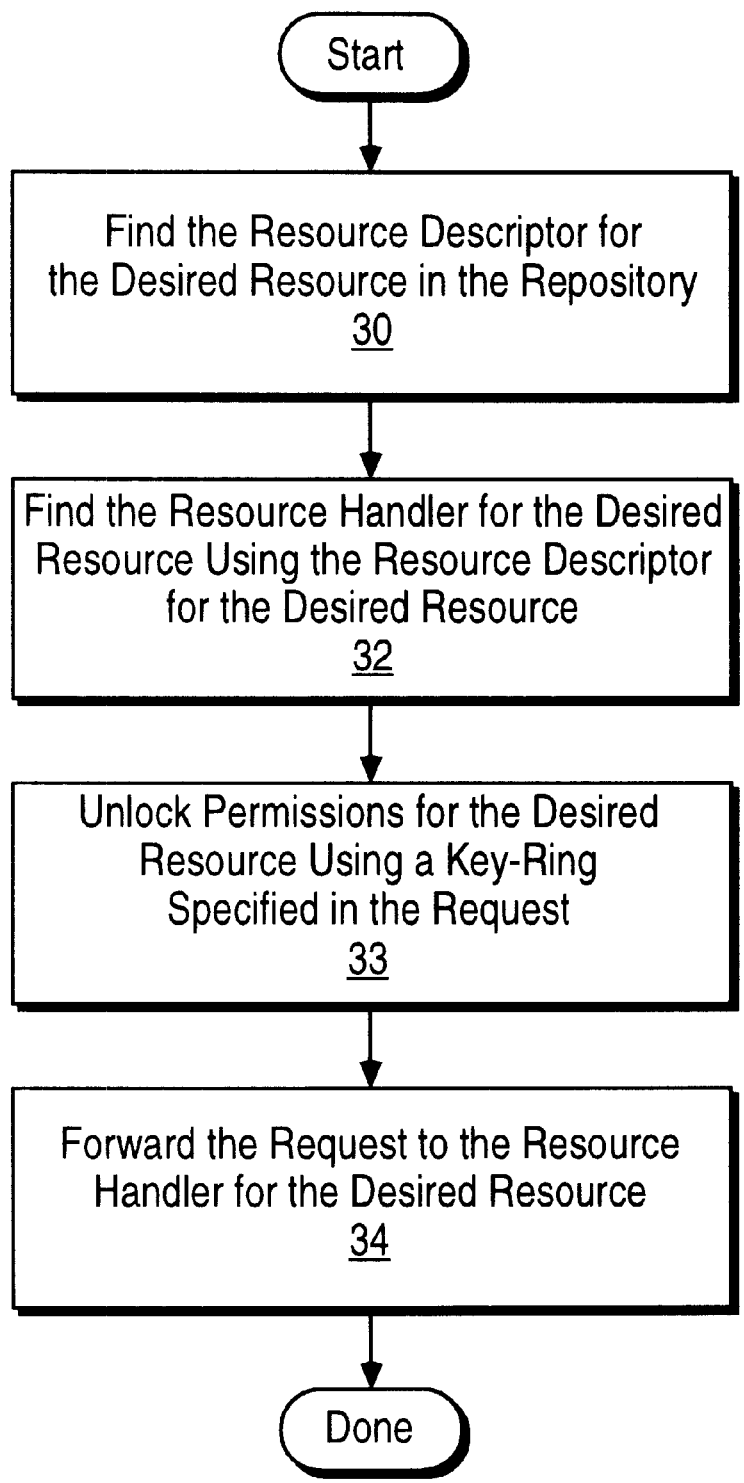

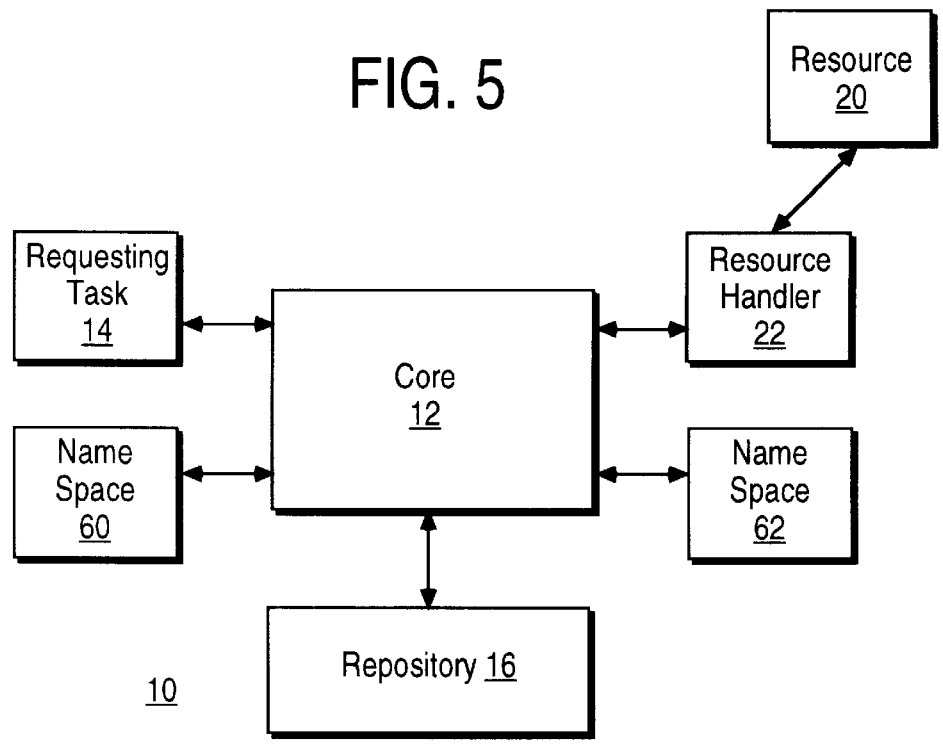
FIG. 5
FIG. 6A
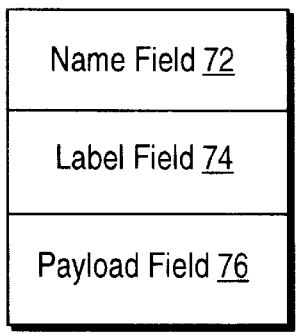
FIG. 6B
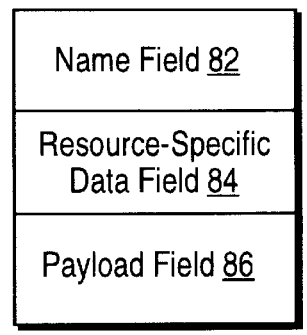

INFRASTRUCTURE FOR AN OPEN DIGITAL SERVICES MARKETPLACE

BACKGROUND OF THE INVENTION

1. Field of Invention

The present invention pertains to the field of digital services. More particularly, this invention relates to an infrastructure for the open digital services marketplace.

2. Art Background

Computer systems and networks of computer systems and other devices capable of digital functionality may be viewed as a collection of resources. Such resources include software resources such as files, databases, processes, and application programs. Such resources also include hardware resources such as printers, communication devices, and display devices to name a few examples. Such software and hardware resources may be collectively referred to as digital services.

Prior computer systems typically include an operating system that mediates requests for particular digital services. A typical operating system not only mediates requests for digital services but also performs resource-specific functions associated with the digital services. For example, a typical operating system not only mediates requests for particular files but also performs file system specific access functions for a particular file system. In addition, prior operating systems usually associate access rights to a resource with a resource name in, for example, a centralized access control list.

Unfortunately, such prior systems usually do not enable services to be dynamically added and removed from availability to requesters. In addition, such systems usually do not allow for competitive digital services to be made available to requesters without requiring modifications to existing resource-specific functions. Moreover, such systems usually do not allow additional tasks to be seamlessly invoked when handling requests for particular resources.

SUMMARY OF THE INVENTION

A software infrastructure is disclosed for providing an open digital services marketplace. The infrastructure includes a naming manager that enables a requesting task to refer to a desired resource using a name which is local to the requesting task. The naming manager translates the name to a reference to the desired resource in response to each request from the requesting task that specifies the name. The infrastructure includes a router that forwards the request to an appropriate handler for the desired resource and that enables at least one additional task to be invoked in response to the request. The infrastructure includes a permission manager that compares a set of access rights of the requesting task to the desired resource to a set of permissions associated with the desired resource such that the access rights are kept separately from the reference to the desired resource. The desired resource, the requesting task, the additional task, and a set of additional components used to handle the request are each modeled as a resource defined by a corresponding set of meta-data. Each set of meta-data includes a set of attributes and a reference to a grammar for interpreting the attributes.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which:

FIG. 3 illustrates the handling of the example request by the core;

FIG. 5 shows an embodiment including a name space associated with a requesting task and a name space associated with a resource handler;

FIGS. 6a–6b illustrate resource identification in a request and a resulting forwarded request;

DETAILED DESCRIPTION

Figure 1:
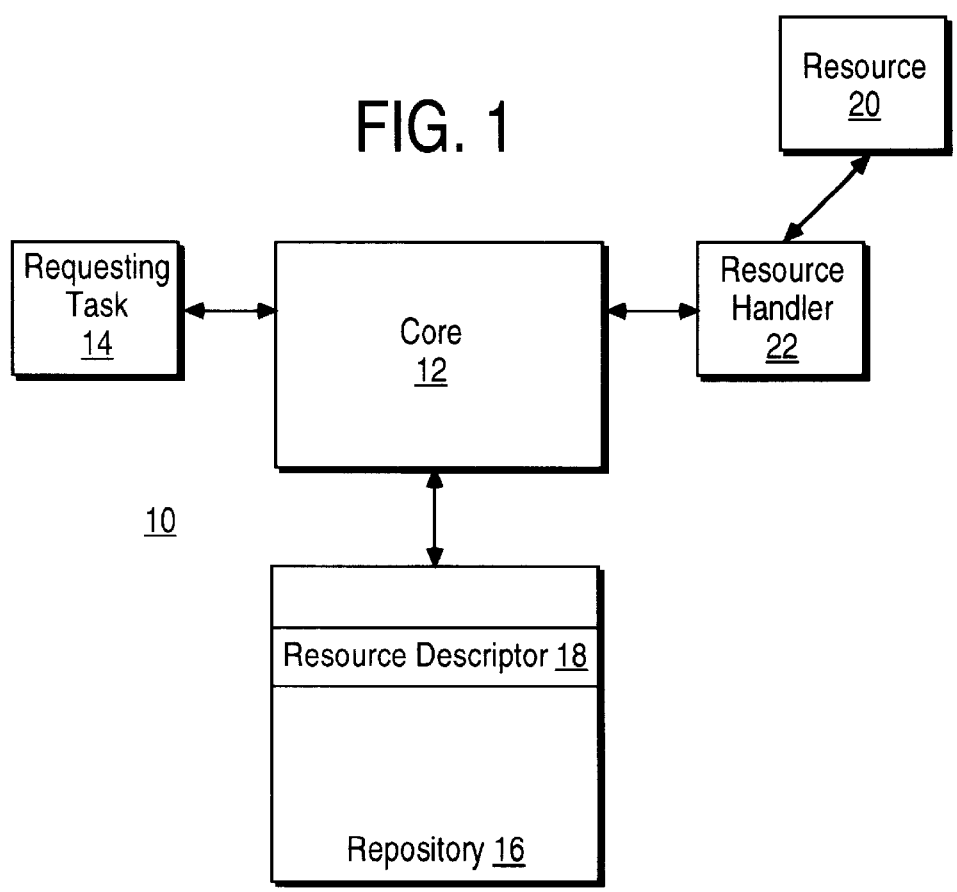
FIG. 1 illustrates a software system having an infrastructure for an open digital services marketplace.

FIG. 1 illustrates a software system 10 having an infrastructure for an open digital services marketplace. This infrastructure is embodied in a core 12 and a repository 16. The core 12 includes a naming manager that enables a requesting task 14 to refer to a resource 20 using a name which is local to the requesting task 14. The naming manager of the core 12 translates the name to a reference to the resource 20 in response to each request from the requesting task 14 that specifies the name.

The core 12 includes a router that forwards the request to a resource handler 22 for the resource 20 and that enables at least one additional task to be invoked in response to the request. The additional tasks include authorizers and designated error handlers that may be seamlessly invoked.

The core 12 includes a permission manager that compares a set of access rights of the requesting task 14 to the desired resource 20 to a set of permissions associated with the desired resource 20. The access rights are kept separately from the reference to the resource 20. This disassociation of access rights from references to resources prevents the formation of large and unwieldy access control lists as found in operating systems.

The resource 20, the requesting task 14, the additional task, and a set of additional components used to handle the request are each modeled as a resource defined by a corresponding set of meta-data stored in the repository 16. Each set of meta-data includes a set of attributes and a reference to a grammar for interpreting the attributes. The additional components used to handle the request include resources such as key-rings containing permission keys and name spaces containing name bindings.

The requesting task 14 represents any software element that makes use of resources or digital services such as those associated with the resource 20. The requesting task 14 may be an application program executing in the software system 10. The requesting task 14 may also be a process executing in the software system 10 such as a user interface process that enables a user to launch and interact with various resources in the software system 10.

The resource 20 represents any local or remote resource which may be associated with the software system 10. The resource 20 may be a software resource such as a file, a database, a process, or an application program to name a few examples. The resource 20 may be hardware resource such as a memory segment, a storage device, a printer or other output device, a communication device, an input device, or a display device to name only a few examples.

The resource handler 22 manages the resource 20 and includes driver routines adapted to the particulars of the resource 20. For example, if the resource 20 is a file, the resource handler 22 includes driver routines for reading and writing file data to and from the physical medium that holds the file. The resource handler 22 makes the resource 20 available to the requesting task 14 by registering the resource 20 to the core 12. The resource handler 22 may execute on the same computer system as the core 12 or on a different computer system with appropriate interconnect to the core 12.

The infrastructure provided by the core 12 enables the requesting task 14 to access the resource 20 even though the core 12 does not deal with the actual semantics of access to the resource 20. These semantics are instead implemented in the resource handler 22.

The naming manager, the router, and the permission manager of the core 12 provide the same services for all digital services. These services are independent of the particular types of resources being accessed. This enables a uniform method for accessing digital services through the core 12 no matter the type of semantics associated with the corresponding resources.

In general, each resource descriptor in the repository 16 corresponds to a resource which is accessible through the core 12. For example, a resource descriptor 18 corresponds to the resource 20. The resource descriptor 18 is created when the resource handler 22 registers the resource 20 to the core 12. The repository 16 also holds resource descriptors for the additional tasks which may be invoked when handling a request and resource descriptors for additional components used to handle a request. The additional tasks include authorizers and error handlers and the additional components include key-rings and name spaces to name some examples.

The resource descriptors in the repository 16 have a uniform structure for all types of resources including files, processes, computers, etc, and additional tasks and components. For example, the resource descriptor 18 for the resource 20 has the same structure whether the resource 20 is a file, a process, or a device.

Each resource descriptor includes a set of meta-data fields along with a resource-specific data field. The meta-data fields include a resource handler field, an attributes field, and a permissions field, an inheritance field, visibility fields including allow and deny fields, as well as other fields.

The resource handler field of a resource descriptor holds the name of a resource handler that is associated with the corresponding resource. For example, the resource handler field of the resource descriptor 18 contains a reference to the resource handler 22. The router of the core 12 uses the resource handler field of a resource descriptor to determine where to forward messages that are targeted for the corresponding resource.

The attribute field of a resource descriptor holds a set of attributes which are used to identify that resource descriptor. This identification is performed by a repository handler of the core 12 during an attribute-based lookup. An attribute-based lookup of a resource descriptor has the effect of locating the corresponding resource for use by a requesting task. The naming manager creates a name binding between the requesting task and any located resource during an attribute-based lookup.

The permissions field of a resource descriptor contains a set of lock/permission pairs for the corresponding resource. The permission manager of the core 12 matches these lock/permission pairs to keys provided by requesting tasks to extract permissions for use by the resource handler for the corresponding resource. A requesting task presents keys using key-rings which are described in detail below.

The resource-specific data field of a resource descriptor contains resource-specific information that is meaningful to the corresponding handler. The core 12 does not deal with this resource-specific data. Instead, the router of the core 12 forwards this resource-specific data to the resource handler for the corresponding resource. The resource handler is responsible for interpreting the semantics of its corresponding resource and its resource-specific data.

The inheritance field of a resource descriptor is used to list other resources that are required for the corresponding resource. For example, an application program may need a list of additional resources that must be available for it to run correctly. Such a list of additional resources can be provided in the inheritance field of a resource descriptor associated with the application program. The following is an example of an inheritance field of a resource descriptor associated with a particular word processing application:

(593,/rom8.fnt)

(4937,/rom6.fnt)

(332,/ital8.fnt)

Each repository handle (593, 4937, and 332) points to a resource descriptor for a corresponding font file that is needed by the particular word processing application. The inheritance field of the resource descriptor provides a convenient place to list all the resources that will be required for the particular word processing application to execute correctly and provides the handles to the resource descriptors of the required resources.

The allow and deny fields of a resource descriptor are used by the core 12 to control whether a requesting task is allowed to use the corresponding resource. The allow and deny fields are visibility fields and the right of a task to use a resource may be viewed as an access right to the resource. A requesting task can only use the corresponding resource if it presents keys that match at least one value in the corresponding allow field. In addition, a requesting task is not allowed to use the corresponding resource if it presents keys that match at least one value in the corresponding deny field. If a key matches any key in the deny field or no key matches any key in the allow field, then the core 12 acts as if the corresponding resource does not exist.

Table 1 is an example of the information registered in the resource descriptor 18 for an example in which the resource 20 is a file.

TABLE 1

| Repository Handle | 859 |
| Resource Handler: | 3482 |

TABLE 1-continued

| | |
|---|---|
| Resource Specific Data: | /u/user/report.txt |
| Attributes: | 525, DESC="my CU data" |
| Permissions: | 28CFA3 read |
| | 3F323B write |
| | AD9732 execute |
| Inheritance: | — |
| Allow: | 000000 |
| Deny: | FFFFFF |
| Authorizers: | Notify() |
| | Grant() |

The repository handle of 859 is generated by the core 12 when the resource handler 22 registers the resource 20. The repository handle of 859 identifies the resource descriptor 18 in the repository 16.

The resource handler field of the resource descriptor 18 holds a handle of 3482 which is associated with the resource handler 22.

The resource-specific data field of the resource descriptor 18 contains a native operating system pathname "/u/user/report.txt" for the resource 20 in this example.

The permissions field of the resource descriptor 18 holds a lock of 28CFA3 for a read permission associated with the resource 20, a lock of 3F323B for a write permission associated with the resource 20, and a lock of AD9732 for an execute permission associated with the resource 20.

The resource handler 22 sets up the permissions for the resource 20 by providing a list of lock/permission pairs to the core 12 for insertion into the resource descriptor 18. In the example resource descriptor 18 shown in Table 1, the requesting task 14 must provide a key of 28CFA3 to unlock a read permission. Similarly, the requesting task 14 must provide a key of 3F323B to unlock a write permission, and a key of AD9732 to unlock an execute permission for the resource 20.

The allow and deny fields of the resource descriptor 18 are 000000 and FFFFFF, respectively. This means that a requesting task can only use the resource 20 if it presents a 000000 key and is not allowed to use the resource 20 if it presents an FFFFFF key.

The attributes field of the resource descriptor 18 holds an attribute DESC="my CU data" in grammar 525 which is used for an attribute based lookup operation on the resource descriptors contained in the repository 16. This attribute based lookup enables the requesting task 14 to discover the resource 20 by matching to DESC="my CU data" rather than to a name associated with the resource 20. The repository handle 525 refers to a resource that represents a grammar of the attribute description. The repository handle of 525 identifies the grammar that is to be used to interpret the attributes. The grammar itself is a resource and its handler is a grammar handler of the core 12. Once the grammar is identified the grammar handler uses it to interpret the attributes.

In one embodiment of the software system 10, communication between the core 12 and the requesting task 14 and the resource handler 22 is accomplished using a in-box/out-box messaging structure. The requesting task 14 has an out-box for providing messages to the core 12. The out-box of the requesting task 14 holds outgoing messages each of which includes an envelope and a payload. In addition, the requesting task 14 may have one or more in-boxes for holding incoming messages from the core 12. Similarly, the resource handler 22 has an out-box to the core 12 and one or more in-boxes for holding messages from the core 12.

The infrastructure of the core 12 enable the requesting task 14 to access the resources 20 without regard to the identity of the resource handler 22. The requesting task 14 only needs to generate a request and it is the core 12 that determines that it is the resource handler 22 which corresponds to the desired resource specified in the request.

The requesting task 14 initiates an access to the resource 20 by generating a request and placing the request in its out-box to the core 12. The request is a message which specifies a resource-specific function to be performed on a particular resource specified in the request. The core 12 obtains the request from the out-box associated with the requesting task 14 and then mediates the request.

The infrastructure of the core 12 enables the resource handler 22 to perform authentication of permissions associated with the resource 20 without knowing the identity of the requesting task 14 that is making a request for the resource 20. The resource handler 22 is responsible for interpreting the semantics of the permissions.

Figure 2:
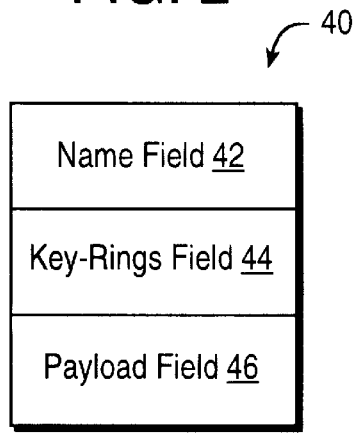
FIG. 2 illustrates an example request from a requesting task.

FIG. 2 illustrates an example request 40 from the requesting task 14. The request 40 contains an envelope that includes a name field 42, a key-rings field 44, and a payload field 46. The name field 42 holds a resource name which is a local name that the requesting task 14 uses to refer to the resource 20 which is the particular resource for which the request 40 is targeted. This particular resource is also referred to as the primary resource or desired resource for the request. The payload field 46 holds a resource-specific command to be performed on the desired resource. The key-rings field 44 contains a list of one or more key-rings each of which is a resource having a resource descriptor registered in the repository 16. Information contained in the key-rings is used by the access control services of the core 12 to unlock permissions associated with the desired resource.

For example, if the resource 20 is a file, the name field may hold the resource name "/myfile.txt" and the payload filed may be "open rw /myfile.txt." The resource name "/myfile.txt" is a local name used by the requesting task 14 to refer to the desired file. The command "open rw myfile.txt" is a resource-specific command to be performed on the desire file. The key-rings field may contain the resource name "mykeys."

FIG. 3 illustrates the handling of the request 40 by the core 12. At step 30, the naming manager of the core 12 finds a resource descriptor in the repository 16 for the desired resource specified by the resource name in the name field 42.

In one embodiment, the naming manager of the core 12 maintains a name space for the requesting task 14. This name space associates or "binds" the local resource names used by the requesting task 14 to repository handles for the repository 16. For example, the name space maintained for the requesting task 14 indicates that the resource name "/myfile.txt" maps to a repository handle of 859 which is the resource descriptor 18.

At step 32, the core 12 finds the resource handler for the desired resource using information contained in the resource descriptor found at step 30. In the example, the core 12 uses the repository handle of 859 to read the resource descriptor 18 and extracts the resource handler specified in the resource descriptor 18, namely 3482 which is a reference to the resource handler 22.

At step 33, the permission manager of the core 12 unlocks permissions which are associated with the desired resource using the key-rings specified in the key-rings field 44. This process is referred to as permission extraction. The permission manager of the core 12 obtains these keys and compares them to the lock/permission pairs contained in the resource descriptor 18 when extracting permissions.

In this example, the core 12 looks up "mykeys" in a name space associated with the requesting task 14 to locate a corresponding resource descriptor in the repository 16. The key-ring resource "mykeys" identifies a set of keys each of which is also a resource having a resource descriptor in the repository 16. The key-ring resource "mykeys" and the keys listed therein are resources and have resource descriptors with allow and deny fields. Therefore, the use of the "mykeys" resource and the keys listed therein can be controlled by writing the allow and deny fields of their resource descriptors. The core 12 as the resource handler for these types of resources can make key-rings and individual keys visible or not visible to the requesting task 14 by manipulating these allow and deny fields.

At step 34, the router of the core 12 forwards the request to the resource handler determined at step 32. In the example, the request containing the payload "open rw /myfile.txt" is forwarded to an in-box of the resource handler 22. The resource handler 22 is then responsible for interpreting any extracted permissions and for performing the "open" command as requested by the requesting task 14 and specified in the payload of the forwarded request.

Figure 4:
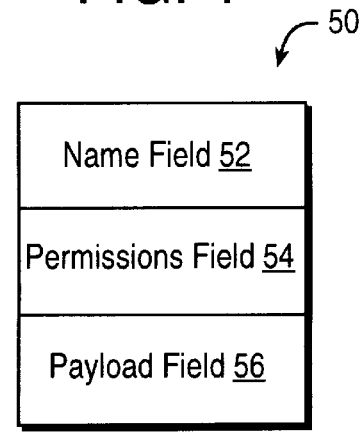
FIG. 4 illustrates an example of a forwarded request from the core.

FIG. 4 illustrates an example forwarded request 50. The forwarded request 50 is constructed by the core 12 and placed into an in-box associated with the resource handler 22 in response to the request 40. The forwarded request 50 includes a name field 52, a permissions field 54, and a payload field 56. The core 12 copies the payload "open rw /myfile.txt" from the payload field 46 of the request 40 into the payload field 56.

In one embodiment, the core 12 copies the name "/myfile.txt" from the name field 42 of the request 40 into the name field 52. This enables the sender of the request 40 to control the name which the recipient uses to refer to a resource. In another embodiment, the core 12 generates a random name which is unique and places the random name into the name field 52.

The core 12 fills the permissions field 54 by comparing the keys specified in the request 40 to the lock/permission pairs contained in the resource descriptor 18. Consider an example in which the keys of the key-ring "mykeys" specified in the request 40 are as follows—28CFA3, 857FHS, and AD9732. In response, the core 12 matches the key of 28CFA3 to 28CFA3/read in the resource descriptor 18 and writes "READ" into the permissions field 54. Similarly, the core 12 matches the key of AD9732 to AD9732/execute in the resource descriptor 18 and writes "EXECUTE" into the permissions field 54.

In this example, the resource handler 22 receives the forwarded request 50 with READ and EXECUTE permissions but not WRITE permission. It is up to the resource handler 22 to interpret what those unlocked READ and EXECUTE permissions mean. The responsibility of the core 12 is to unlock the permissions using the locks provided by the owner of the resource 20 and the keys provided by the requesting task. As a consequence, the core 12 does not need to understand the permission semantics of the file system associated with the resource 20 nor the permission semantics of any of the potentially large numbers and differing type of resources to which it enables access.

FIG. 5 shows an embodiment of the software system 10 including a name space 60 associated with the requesting task 14 and a name space 62 associated with the resource handler 22. The name space 60 is used to hold bindings for names which are used locally by the requesting task 14 and have no meaning outside the requesting task 14. Similarly, the names bound in the name space 62 are local to the resource handler 22.

The names in the name spaces 60–62 are bound to references or handles to resource descriptors in the repository 16. In addition, the name spaces 60 and 62 are resources having corresponding resource descriptors in the repository 16. The naming manager of the core 12 is the resource handler for the names spaces 60 and 62 and as such creates their resource descriptors and sets up the allow and deny fields of the resource descriptors. The core 12 can control the visibility of a particular name space to particular task by writing the allow and deny fields of the resource descriptor for the particular name space.

The following is an example list of entries in the name space 60:

/myfile.txt 859

/boss_is_dumb 42 mykeys 555

With respect to the name space 60, the name "/myfile.txt" is local to the requesting task 14 and corresponds to a resource descriptor handle of 859 which is the resource descriptor 18 for the resource 20. Similarly, the name "boss_is_dumb" is local to the requesting task 14 and corresponds to a repository handle of 42. The name "mykeys" binds to a handle 555 which is a resource descriptor in the repository 16 for a key-ring that holds a set of keys each of which is also a resource having a resource descriptor in the repository 16.

The following is an example list of entries in the name space 62:

/myfile.txt 4732

/boss_is_smart 42

With respect to the name space 62, the name "/myfile.txt" is local to the resource handler 22 and corresponds to a resource descriptor handle of 4732. Although the requesting task 14 and the resource handler 22 both use the name "/myfile.txt" they actually refer to different resources because different resource descriptor handles are bound to the name "/myfile.txt" in the respective name spaces 60–62. On the other hand, the name "boss_is_smart" of the requesting task 14 has the same resource descriptor handle of 42 as the name "boss_is_dumb" used by the resource handler 22. Thus, the names spaces 60–62 enable different tasks to refer to the same resource using different resource names.

The resource-specific information fields of the resource descriptors in the repository 16 contains information that enables the resource handlers to identify corresponding resources. For example, the resource-specific data field of the resource descriptor 18 holds a pathname to the resource 20 in terms of a particular operating system for which the resource 20 is adapted. This enables the resource handler 22 to determine which resource is actually being referred to in a forwarded request.

FIG. 6a illustrates resource identification in a request 70 obtained by the core 12 from the out-box of the requesting task 14. The request 70 includes a name field 72, a label field 74, and a payload field 76. Consider an example in which the name field 72 contains "/mydoc.txt" and the label field 74 contains "/doc.txt" and the payload field 76 contains "open rw /doc.txt." which is a command to be executed on the resource which the requesting task 14 is bound to as mydoc.txt in the name space 60.

FIG. 6b illustrates a forwarded request 80 which the core 12 constructs in response to the request 70 and places in an in-box of the resource handler 22. The forwarded request 80 includes a name field 82, a resource-specific data field 84, and a payload field 86.

The core 12 looks up "/mydoc.txt" in the name space 60 in response to the name field 72 and obtains a handle to the repository 16. In this example the obtained handle is 859 and is the resource descriptor 18 for the resource 20. The core 12 copies "/doc.txt" from the label field 74 to the name field 82 and copies "open rw /doc.txt" from the payload field 76 to the payload field 86.

The core 12 obtains "/u/user/report.txt" from the resource-specific data field of the resource descriptor 18 (see Table 1) and copies it to the resource-specific data field 84 of the forwarded request 80. The core 12 also writes unlocked permissions into the forwarded request 80 in the manner previously described. The core 12 then sends the forwarded request 80 to the resource handler 22 and places a binding between "/doc.txt" and the repository handle of 859 into the name space 62.

The resource handler 22 then uses the information "/u/user/report.txt" contained in the forwarded request 80 to identify the resource 20 which in this example is file having the pathname /u/user/report.txt in terms of the native operating system of the particular computer system on which the resource handler 22 is implemented.

Figure 7:
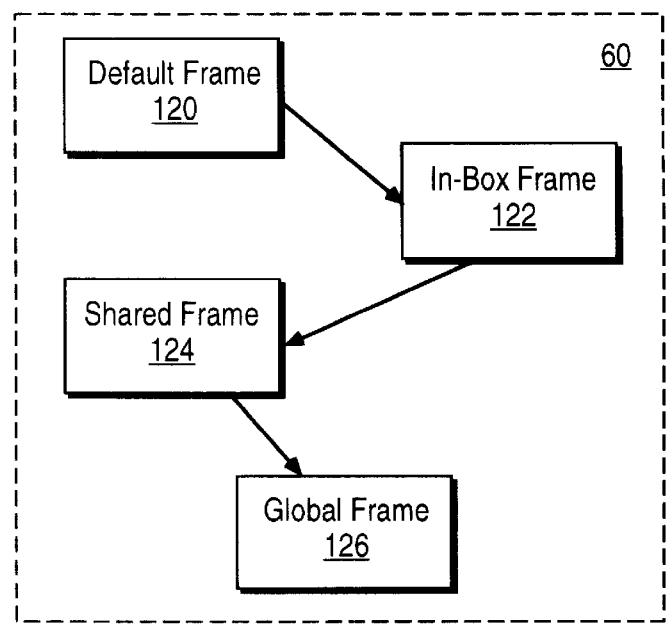
FIG. 7 shows an example structured name space which includes an ordered list of frames.

FIG. 7 shows an example structure for the name space 60. The name space 60 is a structured name space which includes an ordered list of frames 120–126. Each of the frames 120–126 is a resource with a resource descriptor in the repository 16. Each of the frames 120–126 holds collections of name bindings for resource descriptors in the repository 16.

The naming manager of the core 12 obtains a reference or handle to the resource descriptor for a desired resource specified in a request from the requesting task 14 by searching the name space 60. The naming manager first looks in the default frame 120. If no match is found then it looks in the in-box frame 122, then the shared frame 124, and then the global frame 126. If no match is found then an error is returned to the requesting task 14.

The requesting task 14 may have multiple name spaces allocated to it. The requesting task 14 specifies which name space is to be used when it transfers a request to the core 12. This specification may be contained in each name field of the request. This enables the requesting task to maintain different names spaces for different contexts.

The structure shown enables one task to deliver name bindings to another task while avoiding name conflicts. For example, the resource handler 22 transfers name bindings to the requesting task 14 by providing a message to the core 12 which specifies the in-box of requesting task 14 as the desired resource. This message contains a list of names for which name binding are to be delivered to the requesting task 14. In response, the core 12 forwards the message to the in-box of the requesting task 14 and places name bindings for the names contained in the message into the in-box frame 122, thereby avoiding conflicts with names contained in other frames of the name space 60. Thereafter, the requesting task 14 can rename or move the delivered binding to another frame or name space before another binding is delivered into the in-box frame 122.

The requesting task 14 is provided with an initial operating environment which includes a default name space. This default name space also contains a default key-ring. The requesting task 14 can thereafter request that the core 12 create additional name spaces such as the name space 60. To do this, the requesting task 14 transfers a message to the core 12 which specifies a desired resource for which the core 12 is the resource handler and which contains the ordered list of the frames 120–126. In response, the naming manager of the core 12 creates the name space 60 and the frames 120–126 and writes bindings for the frames 120–126 and the name space 60 into the default name space of the requesting task 14. Thereafter, the requesting task 14 can specify the name space 60 for use in resolving names in an request.

The name space 60 and the frames 120–126 are resources with allow and deny fields in their respective resource descriptors. As a consequence, the requesting task 14 must provide the appropriate keys for the allow and deny fields in order to access these resources or use them for name resolution.

Figure 8:
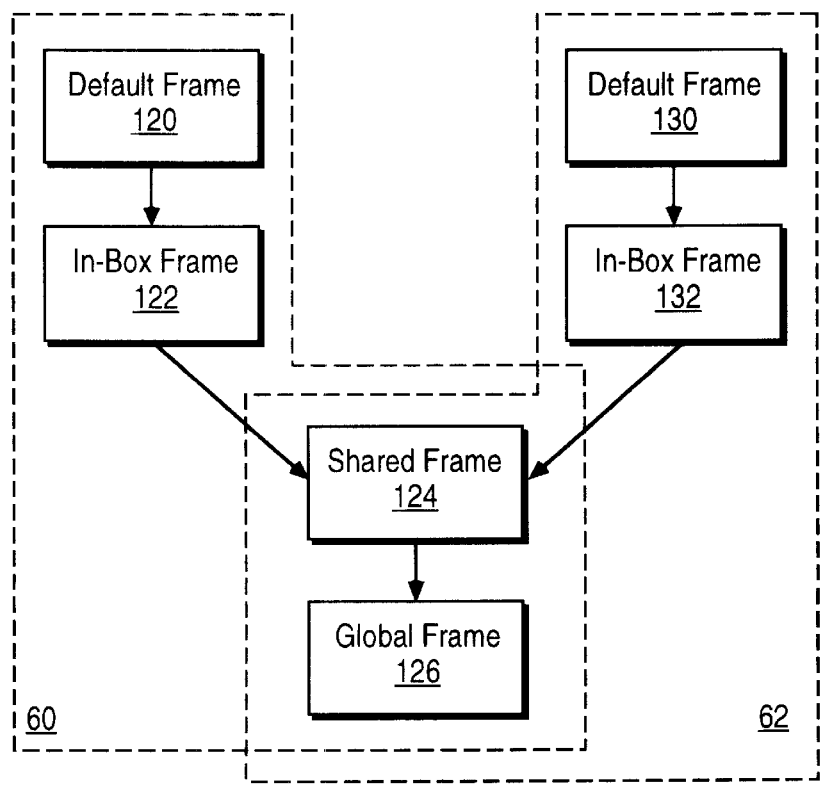
FIG. 8 shows example structures for the name spaces which enable sharing of name bindings between the requesting task and the resource handler.

FIG. 8 shows example structures for the name spaces 60–62 which enable sharing of name binding between the requesting task 14 and the resource handler 22. The name space 130 includes a default frame 130 and an in-box frame 132 and shares the shared frame 124 and the global frame of the name space 126. Any name binding that is placed in the shared frame 124 or the global frame 126 is visible to both the requesting task 14 and the resource handler 22.

The naming manager of the core 12 searches the name space 60 in the following order. The naming manager first looks in the default frame 120, then the in-box frame 122, then the shared frame 124, and then the global frame 126 until a match is found. If no match is found then an error is returned to the requesting task 14. The naming manager searches the name space 62 by first searching the default frame 130, then the in-box frame 132, then the shared frame 124, and then the global frame 126 until a match is found.

In one embodiment, the naming manager of the core 12 provides flexible name bindings in the name spaces 60–62. For example, a resource name in the name space 60 may be bound to zero or more resource descriptors in the repository 16 and to an optional resource description. The bindings to resource descriptors take the form of references, i.e. repository handles, to resource descriptors in the repository 16. The binding to the optional resource description may take the form of a set of desired attributes for the desired resource.

As previously described, a request from the requesting task 14 includes a resource name for a desired resource and a name for the name space which is to be used to resolve the desired resource name, which in these examples is the name space 60. A resource name also includes a binding-type indicator that informs the name resolution services of the core 12 of how to interpret the name bindings in the name space 60.

The binding-type indicators include an indication that the core 12 should use tight binding. In response, the core 12 uses resource descriptor references in the name space 60 to resolve the desired resource name. If more than one resource descriptor for the desired resource name is listed in the name space 60 then the core 12 uses a specified arbitration policy to select one or more.

The binding-type indicators include an indication that the core 12 should use loose binding. In response, the core 12 obtains the optional resource description for the desired resource name from the name space 60 and then searches the repository 16 for matching attributes in a manner similar to an attribute-based lookup. If more than one resource descriptor matches the desired resource description then the core 12 uses a specified arbitration policy is to select one.

The binding-type indicators include an indication that causes the name resolution services of the core 12 to use tight binding if any of the resources referenced by the resource descriptors which are bound to the desired resource name are available and to use loose binding otherwise. This will handle cases in which resources previously bound are later removed from the repository 16 or made invisible to the requesting task 14 by modification of allow/deny fields.

The binding-type indicators include an indication that the core 12 should use loose binding to update the list of tightly bound resources. In response, the core 12 uses the optional resource description which is bound to the desired resource name to search the repository 16 for matching attributes and then binds the matching resource descriptors to the desired resource name in the name space 60. This will enable the requesting task 14 to see new resources that match the desired attributes as they become available.

The binding-type indicators include an indication that the core 12 should remove any tight bindings to resources that are not currently available. In response, the core 12 searches the repository 16 for resource descriptors that are bound to the desired resource name and determines whether those resources are still available to the requesting task 14. Any that are unavailable are removed from being bound to the desired resource name in the name space 60. Other binding types may also be employed.

Figure 9:
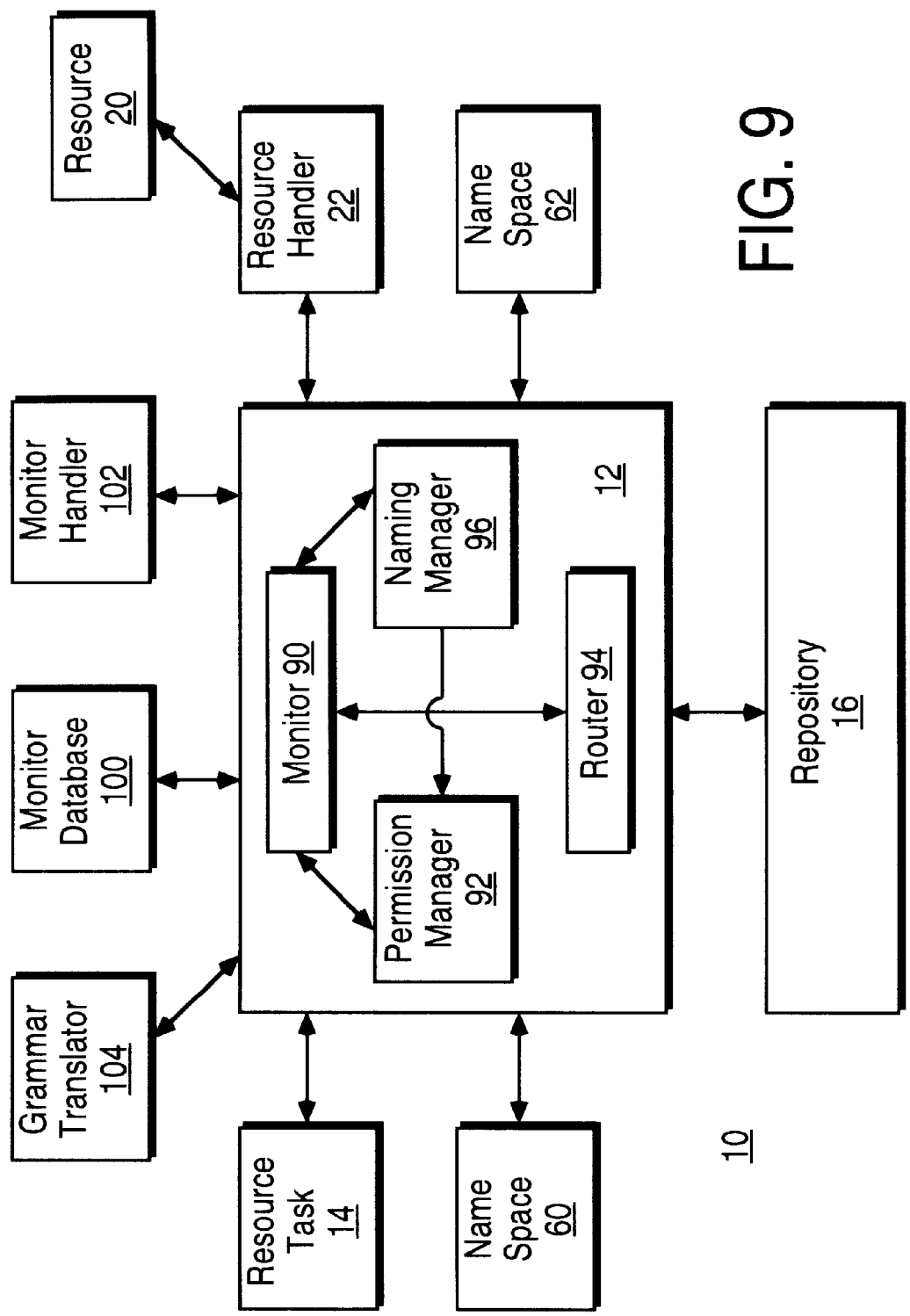
FIG. 9 shows the structure of the core in one embodiment.

FIG. 9 shows the structure of the core 12 in one embodiment. The core 12 includes a monitor 90, a permission manager 92, a naming manager 96, and a router 94. The monitor 90 is associated with a monitor database 100 and a monitor handler 102. Also shown is a grammar translator 104.

The router 94 obtains access request messages from the out-boxes of requesting tasks, such as the requesting task 14, and forwards the access request messages to an in-box of the appropriate resource handlers, such as the resource handler 22 in the manner described above. The naming manager 96 uses the resource names from the name fields of access request messages to obtain handles to the resource descriptors in the repository 16. The permission manager 92 compares the information from key-rings specified in access request messages to lock/permission pairs in the appropriate resource descriptors in the repository 16 and enforces visibility according to the allow and deny rules as previously described.

The monitor 90 records all resource accesses in the monitor database 100. The monitor 90 obtains access request messages originated by tasks from the router 94 and records them in the monitor database 100. The monitor 90 also obtains forwarded access request messages from the router 94 and records them in the monitor database 100. In addition, the monitor 90 obtains information regarding name guessing and password guessing from the naming manager 96 and the permission manager 92, respectively, and records this information in the monitor database 100.

The information recorded by the monitor 90 may be filtered to reduce the volume of stored information. For example, large payloads exceeding a predetermined size may not be recorded. In addition, certain types of records may not be recorded such as file read requests.

The monitor database 100 is a resource and has a resource descriptor in the repository 16. The monitor handler 102 is identified in the resource descriptor for the monitor database 100 as the resource handler for the monitor database 100. Tasks in the software system 10 can request read operations on the contents of the monitor database 100 using access request messages. As before, a requesting task must present the appropriate keys to unlock the appropriate permissions for access to the monitor database 100.

In addition, the permissions associated with the monitor database 100 may correspond to individual resources or groups of resources. This enables monitoring functions in the software system 10 to be divided among differing tasks with each task being given keys to only a subset of the information in the monitor database 100.

The monitor handler 102 as the resource owner for the monitor database 100 registers a resource description containing lock/permission pairs for particular resources or groups of resources in the repository 16. Thereafter, the core 12 receives a request that specifies a resource or group of resources and corresponding keys from a requesting monitoring task. The core 12 then compares the keys to the lock/permission pairs in the repository 16 and unlocks permissions of individual resources or groups of resources only if the appropriate keys are provided by the requesting task.

As described above, the software system 10 does not assign a globally unique name to resources. Instead, names are local to tasks and tasks may have differing names for the same resource or the same name for differing resources. This obviates the need for name coordination among the potentially large number of resources that may be accessible through the core 12.

Before a task can issue an request for a particular resource, the particular resource must be visible to the task in its corresponding name space. To make a desired resource visible in its name space, a task issues a get resource message to the core 12. Since resources do not have agreed upon global names, a task must request a desired resource based not on its name but upon its attributes. The task includes a set of attributes for the desired resource in the get resource message and in response the core 12 performs an attribute-based lookup of the repository 16 to locate the desired resource. This allows a task to discover desired resources that are accessible via the core 12 at any time as resource owners register new resources into the repository 16.

For example, the requesting task 14 discovers the resources that are accessible through the core 12 by providing a get resource message to the core 12. The get resource message contains a set of attributes for a desired resource. The get resource message is passed to the core 12 via the out-box of the requesting task 14. In response, the core 12 performs an attribute-base lookup of the repository 16 to locate the desired resource according to its attributes and binds the desired resource to the requesting task 14.

The following is an example of a get resource message from the requesting task 14:

get{docGrammar,DOC="exampledocument"}, bind to
    /mydocument.doc

This example get resource message specifies an attribute DOC of "exampledocument" and a binding to the name "mydocument.doc" in the name space 60 for the requesting task 14. Although this example specifies only one attribute, (DOC="exampledocument") a get resource message in general may contain any number of attributes.

Figure 10:
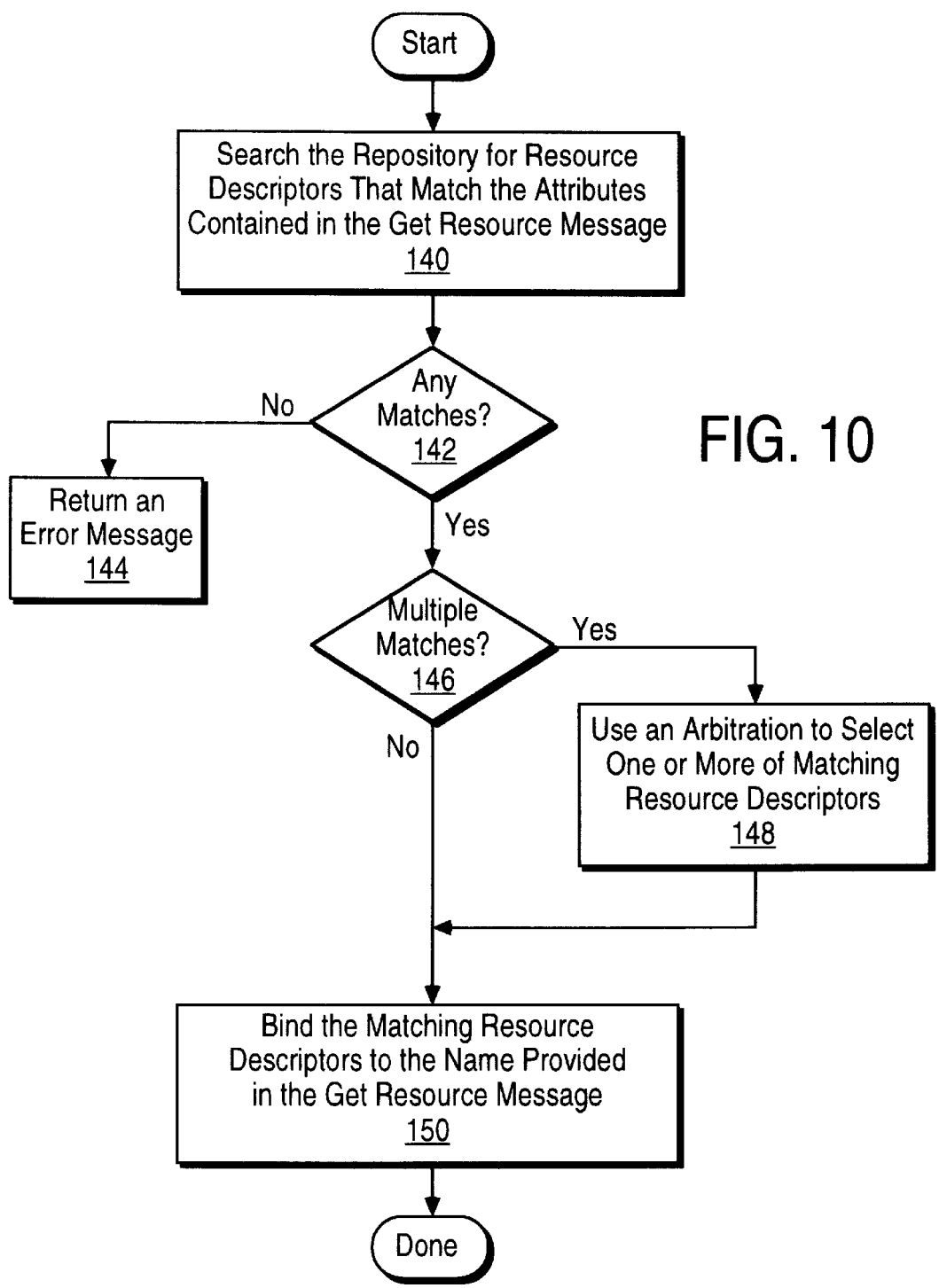
FIG. 10 shows the basic steps of the attribute-based lookup.

FIG. 10 shows the basic steps of an attribute-based lookup. At step 140, the repository 16 is searched for resource descriptors that match the attributes in a get resource message from the requesting task 14. In the example shown above, the repository 16 is searched for resource descriptors having the "DOC=exampledocument" attribute.

At step 142, if no matches were found at step 140 then an error message is returned to the requesting task 14 at step 144. At step 146, if multiple resource descriptors were found at step 140, then a designated arbitration is used to select one or more of them at step 148. An error is indicated if no resources are selected at step 148.

At step 150, the matching resource descriptor is bound to the name provided in the get resource message. In the example get resource message shown above, the name space 60 is written with a binding of "/mydocument.doc" to the handle of the matching resource descriptor or the resource descriptor selected at step 148.

If a get resource message specifies multiple attributes then a decision as to what is to be declared a match at step 140 depends upon a particular attribute grammar. An attribute grammar may specify that all attributes must match exactly. Alternatively, an attribute grammar may specify a matching range or may specify that only a partial subset of the attributes need to match to be declared a match at step 140. Attribute grammars are one type of the additional components used to handle a request.

An attribute grammar is a resource managed by the core 12 which provides a specification of how a set of attributes are to be interpreted. A resource descriptor contains a reference to an attribute grammar which is to be used to interpret the attributes contained in the resource descriptor. In addition, a get resource message includes a grammar name for an attribute grammar which is to be used to interpret the attributes contained in the get resource message.

The infrastructure provided by the core 12 avoids imposing a single attribute grammar to which all requesting tasks in the software system 10 must comply. For example, the requesting task 14 may represent attributes in units that differ from the attributes contained in the resource descriptors in the repository 16. A grammar translator 104 is a task that translates attributes from the representation used by the requesting task 14 to the representation contained in the repository 16. The software system 10 may in general have any number of grammar translators which are competitive resources registered with the core 12. The requesting task 14 in one embodiment discovers the grammar translator 104 using an attribute based lookup.

The requesting task 14 obtains translated attributes by sending a message through the core 12 to the grammar translator 104 with the payload of the message containing the attributes to be translated. The grammar translator 104 translates the attributes and returns them back to the requesting task 14. The requesting task 14 then puts the translated attributes into a get resource message to the core 12 which then performs an attribute based lookup as previously above.

Tasks in the software system 10 start with a default set of resources for an initial operating environment. The default resources are set up through the core 12 and provide a protection domain and enough resources to enable a task to obtain additional resources using get resource messages.

A user logs into the software system 10 by generating a get user resource message to obtain an operating environment. The following is an example get user resource message:

get{coregrammar, USER=username, password=m20xyo}, bind to myname

The user resource with the name "username" is configured ahead of time with a set of resource descriptors in the repository 16. These resource descriptors include a default name space and a default key-ring.

The core 12 enables advanced security control for particular resources or groups of resources. Each resource descriptor in the repository 16 includes an authorizer field. The authorizer field may designate one or more resource authorizers for the corresponding resource. For each designated authorizer, there is a bit that indicates whether the corresponding authorizer is a notify authorizer or a grant authorizer.

Notify authorizers are notified by the router 94 of the transfer of a name binding for the corresponding resource. This enables a notify authorizer to maintain an audit trail for messages associated with the corresponding resource.

If an authorizer is a grant authorizer, then the router 94 does not deliver a name binding for the corresponding resource with message delivery. Instead, the name binding delivery is held up while waiting for validation by the grant authorizer. This enables a grant authorizer to control which tasks are allowed to obtain a binding to the corresponding resource.

Figure 11:
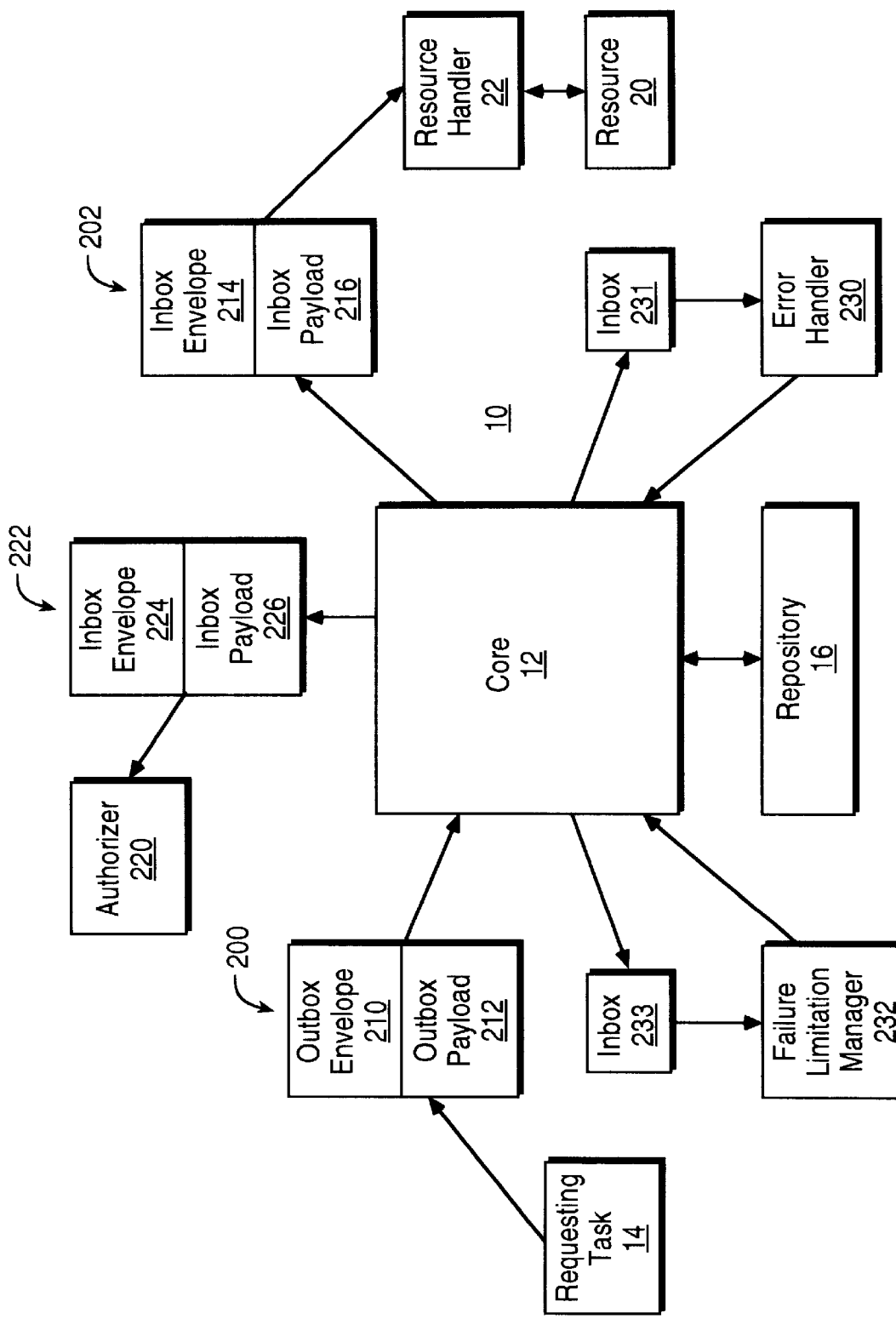
FIG. 11 shows the basic messaging structure provided by the core and shows additional tasks that may be invoked when handling requests.

FIG. 11 shows the basic messaging structure provided by the router 94 and shows additional tasks that may be invoked when handling requests. The resource descriptor 18 specifies the authorizer 220 as an authorizer for the resource 20. The resource descriptor 18 also indicates whether the authorizer 220 is a notify or a grant authorizer. The authorizer 220 is an example of an additional task that may be invoked when handling a request.

The requesting task 14 sends a message such as a request to the resource handler 22 by placing a message 200 in its out-box that specifies the resource 20 as the desired resource or primary resource. In response, the router 94 looks up the desired resource in the repository 16 to identify the resource handler 22 and then creates a forwarded message 202 and places the forwarded message 202 in an in-box of the resource handler 22.

The message 200 includes an out-box envelope 210 and an out-box payload. The out-box envelope 210 includes a name field for the desired resource, a list of name fields of key-rings, and a set of name fields for additional resource for which name bindings are to be delivered to the resource handler 22. Each name field in the out-box envelope 210 includes a name field for the name space which the core 12 will use to resolve names along with a local name used by the requesting task 14.

The core 12 first looks up the default name space and default key-ring which are associated with the requesting task 14. The default name space and key-ring form part of a protection domain which is initially set up for the requesting task 14. The default name space, for example the name space 60, is then used by the core 12 to look up the names contained in the out-box envelope 210. The core 12 looks up the desired resource, the resource 20, and any additional resources specified in the out-box envelope 210 for which name bindings are to be delivered.

Thereafter, the core 12 performs permission extraction and constructs an in-box envelope 214 for the forwarded message 202. The in-box envelope 214 contains the extracted permissions and a set of additional name fields. Each additional name field includes a flag that is set if the corresponding name binding delivery is to be delayed by the authorizer 220. This flag is set for the name binding associated with the resource 20 if the authorizer 220 is a grant authorizer. The in-box payload 216 contains the information obtained from the out-box payload 212.

The router 94 also constructs a message 222 for transfer to the authorizer 220 because a name binding for the resource 20 is being delivered to another task, namely the resource handler 22, and because the authorizer 220 is designated in the resource descriptor 18. The router 94 constructs similar messages for any other authorizers of resources for which name binding in the out-box envelope 210 are being delivered.

If the authorizer 220 is a notify authorizer, then the router 94 delivers the name binding for the resource 20 to the resource handler 22 when delivering the forwarded message 202. The router 94 delivers the name binding for the resource handling 22 by writing the name binding into the in-box frame 132 of the name space 62.

In one embodiment, if the authorizer 220 is a grant authorizer, then the router 94 delivers the forwarded message 202 without the name binding for the resource 20. It is up to the grant authorizer 220 to authorize the delivery of the name binding according to its own authorization semantics. The grant authorizer 220 can subsequently deliver the name binding for the resource 20 by placing a message in its out-box that specifies a primary resource for which the core 12 is the resource handler. The payload of this message contains an indication that the grant authorizer 220 is the authorizer for the name binding to be delivered. The core 12 will then write the name binding into the in-box frame 132 of the name space 62 to complete the delayed delivery of the name binding.

In another embodiment, if the authorizer 220 is a grant authorizer, then the router 94 delivers the forwarded message 202 with a partial name binding for the resource 20. A partial name binding is a name binding that the resource handler 22 can use to request completion of the delivery of the name binding. The partial name binding is indicated using a flag associated with the name binding which is kept by the core 12. The resource handler 22 provides a message to the core 12 to request completion of the name binding, the core 12 forwards this request to the authorizer 220, and the authorizer 220 completes the name binding if it is allowed according to its own authorization semantics.

The authorization semantics implemented in the authorizer 220 are independent of the core 12. This structure enables advance security controls to be provided for name binding delivery, and therefore access control, without having to embed such controls in the core 12. The core 12 merely forwards messages to the appropriate authorizers that are registered in the repository 16.

An error handler 230 is another example of an additional task that may be invoked when handling a request. The error handler 230 is a designated error handler in the software system 10. The error handler 230 include an in-box which is a resource registered in the repository 16. The error handler 230 is registered as the resource handler for the in-box of the error handler 230. The requesting task 14 can discover the in-box for the error handler 230 by performing an attribute based lookup to locate error handler attributes.

The out-box envelope 210 includes an error handler name field that designates a mailbox resource to which errors are to be forwarded if an error occurs when the resource handler 22 performs the resource-specific command contained in the out-box payload 212. This error handler mailbox resource may be the in-box of the error handler 230 or an in-box of the requesting task 14. The requesting task 14 controls which mailbox is to receive errors by writing the appropriate resource name into the error handler name field of the out-box envelope 210. The router 94 delivers a name binding for the error handler name field to the resource handler 22 and the resource handler 22 records this name for use in sending error messages.

The requesting task 14 may receive a bad or unexpected response from the resource handler 22. In addition, the requesting task 14 may not receive a response from the resource handler 22 within a predetermined time-out interval. The requesting task 14 reports these types of errors to a failure limitation manager 232.

The failure limitation manager 232 is a task that collects reports of errors from all tasks in the software system 10 including the requesting task 14. The failure limitation manager 232 may take one or more of several possible actions when a task reports an error associated with a particular resource or when a threshold number of errors associated with a particular resource is reached. These actions limit the effect of failures associated with the particular resource. For example, the failure limitation manager 232 may send messages to other tasks in the software system 10 to notify them that the particular resource is bad or unavailable. The failure limitation manager 232 may also send a message to the resource handler for the particular resource which causes it to shut down and remove the particular resource from availability in the repository 16.

The infrastructure provided by the core 12 enables the requesting task 14 to construct a local view of the repository 16. This local view may be referred to as a repository view. The requesting task 14 requests the creation of a repository view by placing a message in its out-box that names a primary resource for which the core 12 is the resource handler. The payload of this message may include a command to create a repository view called "mystuff" along with a list of names of resource to be placed in "mystuff." In response, the core 12 as the resource handler for this message creates a repository view called "mystuff" and copies the resource descriptors for the specified resource names to the "mystuff" repository view. Thereafter, the requesting task 14 can specify to the core 12 that the repository view "mystuff" is to be used to process get resource messages in its out-box to the core 12.

Figure 12:
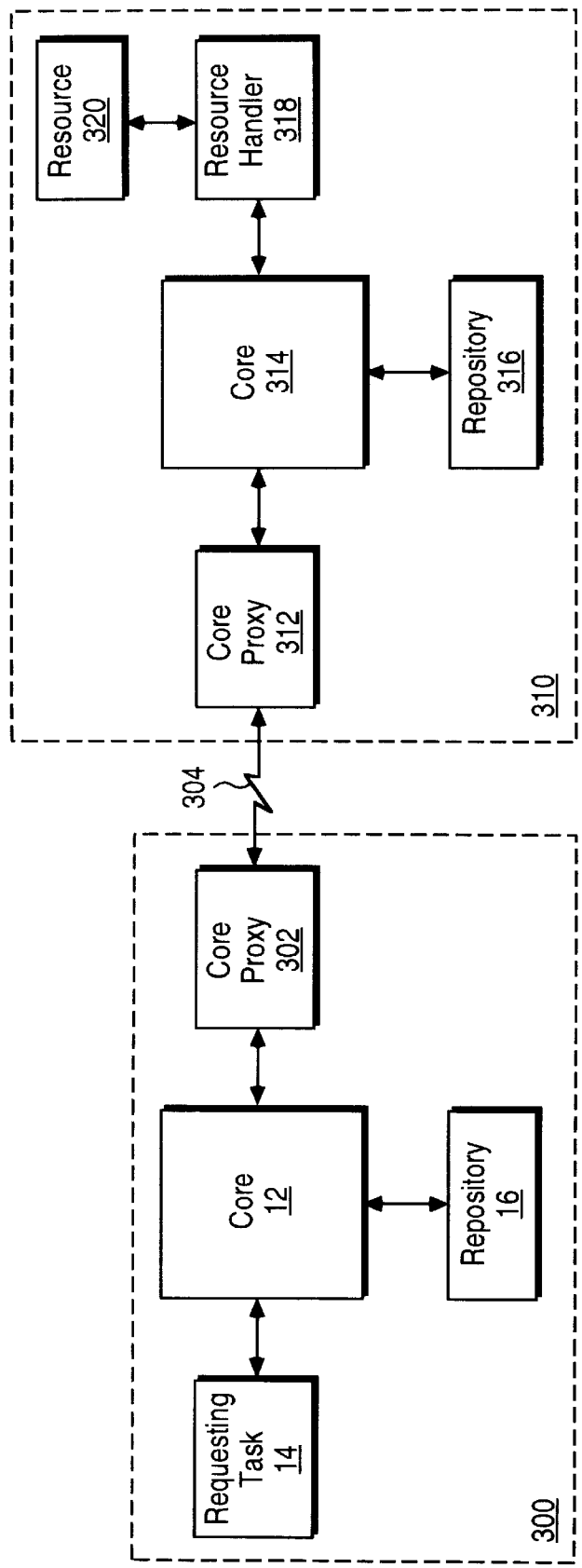
FIG. 12 shows how the infrastructure for open digital services market place may be used to enable a task to use a resource of a separate computer system.

FIG. 12 shows how the infrastructure for open digital services market place may be used to enable a task to use a resource of a separate computer system. A pair of computer systems 300 and 310 are shown which are interconnected via a communication link 304. The computer system 300 includes the infrastructure for open digital services marketplace embodied in the core 12 and the repository 16. The computer system 310 includes an infrastructure for open digital services marketplace embodied in a core 314 and a repository 316.

The computer system 310 includes a resource 320 which is to be made available to tasks executing on the computer system 300. The computer system 310 executes a core proxy 312 which obtains a name binding including a local name for the resource 320 in a manner previously described. The core proxy 312 exports the resource description for the resource 320 to a core proxy 302 executing on the computer system 300. The core proxy 302 then registers the resource 320 to the core 12. The registration of the resource 320 to the core 12 creates an entry in the repository 16 that names the core proxy 302 as the resource handler for the resource 320 and that includes a resource-specific data field that contains the local name of the resource 320 used by the core proxy 312.

Thereafter, the core proxy 302 and the core proxy 312 translate between local names used by tasks on the computer system 300 and local names used by the core proxy 312. For example, a message generated by the requesting task 14 that names the resource 320 as the desired resource is forwarded to the core proxy 302 by the core 12. The resource-specific data field of this forwarded message contains the local name for the resource 320 used by the core proxy 312. The core proxy 302 transfers the forwarded message to the core proxy 312 which then generates a request message to the core 314 that names as the desired resource the local name contained in the resource-specific data field of this forwarded message.

A similar arrangement may be used for communication between tasks associated with infrastructures that are implemented on the same computer system. For example, the core 12 and the core 314 may be implemented on the same computer system with the core proxy 302 and the core proxy 312 translating between local names associated with the cores 12 and 314.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An software infrastructure for an open digital services marketplace, comprising:

naming manager that enables a requesting task to refer to a desired resource using a name which is local to the requesting task by translating the name to a reference to the desired resource in response to a request from the requesting task that specifies the name;

router that forwards the request to an appropriate handler for the desired resource and that enables at least one additional task to be invoked in response to the request;

permission manager that compares a set of access rights of the requesting task to the desired resource to a set of permissions associated with the desired resource such that the access rights are kept separately from the reference to the desired resource;

wherein the desired resource, the requesting task, the additional task, and a set of additional components used to handle the request are each modeled as a resource defined by a corresponding set of meta-data, each set of meta-data having a set of attributes and a reference to a grammar for interpreting the attributes.

2. The software infrastructure of claim 1, wherein the additional task is a grant authorizer that determines whether a name binding contained in the request is to be delivered to the appropriate handler.

3. The software infrastructure of claim 1, wherein the additional task is a notify authorizer that maintains an audit trail of messages associated with the desired resource.

4. The software infrastructure of claim 1, wherein the additional task is an error handler that is to be used if the request causes an error.

5. The software infrastructure of claim 1, wherein the additional components include a key-ring associated with the requesting task which includes a set of keys that are used to unlock the permissions associated with the desired resource.

6. The software infrastructure of claim 5, wherein the router forwards unlocked ones of the permissions to the appropriate resource handler such that the appropriate resource handler is responsible for interpreting semantics of the permissions.

7. The software infrastructure of claim 1, wherein the additional components include the grammar for interpreting the attributes.

8. The software infrastructure of claim 1, wherein the access rights include a set of visibility fields that determine whether the requesting task has a right to use the desired resource.

9. The software infrastructure of claim 1, wherein the additional task is a failure limitation manager which collects reports of a failure associated with the desired resource and which performs an action to limit effects of the failure.

10. The software infrastructure of claim 9, wherein the action is to notify one or more other tasks that the desired resource is unavailable.

11. The software infrastructure of claim 9, wherein the action is to cause the appropriate resource handler to shut down and remove the desired resource from availability.

12. The software infrastructure of claim 1, wherein the grammar for interpreting the attributes is modeled as a resource defined by a corresponding set of meta-data.

13. The software infrastructure of claim 1, wherein the attributes enable a task to discover the corresponding resource using an attribute-based lookup.

14. The software infrastructure of claim 1, wherein the appropriate handler for the desired resource is a core proxy that translates between a local name for the desired resource used by the core proxy and a local name for the desired resource which is used by a task associated with a separate software infrastructure for an open digital services marketplace.

15. The software infrastructure of claim 14, wherein the separate software infrastructure is implemented on a separate computer system.

16. The software infrastructure of claim 1, wherein the appropriate resource handler makes the desired resource available by registering the meta-data for the desired resource.

17. The software infrastructure of claim 1, further comprising a handler that performs an attribute-based lookup on the meta-data to discover the desired resource in response to a request from a task that specifies a set of desired attributes and a grammar for interpreting the desired attributes.

18. The software infrastructure of claim 17, wherein the grammar for interpreting the desired attributes is modeled as a resource defined by a corresponding set of meta-data.

19. The software infrastructure of claim 1, further comprising a monitor that records the request in a monitor database.

20. An apparatus for an open digital services marketplace, comprising:

means for enabling a requesting task to refer to a desired resource using a name which is local to the requesting task by translating the name to a reference to the desired resource in response to a request from the requesting task that specifies the name;

means for forwarding the request to an appropriate handler for the desired resource and for invoking at least one additional task in response to the request;

means for comparing a set of access rights of the requesting task to the desired resource to a set of permissions associated with the desired resource such that the access rights are kept separately from the reference to the desired resource;

wherein the desired resource, the requesting task, the additional task, and a set of additional components used to handle the request are each modeled as a resource defined by a corresponding set of meta-data, each set of meta-data having a set of attributes and a reference to a grammar for interpreting the attributes.

* * * * *